(12) United States Patent
Liu et al.

(10) Patent No.: US 12,122,550 B2
(45) Date of Patent: Oct. 22, 2024

(54) BAG BREAKING DEVICE FOR GARBAGE BAG

(71) Applicant: Guangzhou University, Guangdong (CN)

(72) Inventors: Changhong Liu, Guangdong (CN); Xingxin Yang, Guangdong (CN); Henghao Li, Guangdong (CN); Shaohu Peng, Guangdong (CN); Dong Tang, Guangdong (CN); Lingxi Peng, Guangdong (CN); Jiachun Wu, Guangdong (CN); Tuxian Ye, Guangdong (CN); Ziliang Li, Guangdong (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 349 days.

(21) Appl. No.: 17/566,725

(22) Filed: Dec. 31, 2021

(65) Prior Publication Data

US 2022/0119146 A1    Apr. 21, 2022

Related U.S. Application Data

(63) Continuation of application No. PCT/CN2020/120512, filed on Oct. 13, 2020.

(30) Foreign Application Priority Data

Oct. 18, 2019    (CN) .......................... 201910991941.9

(51) Int. Cl.
    *B65B 69/00*    (2006.01)
(52) U.S. Cl.
    CPC ................ *B65B 69/0033* (2013.01)

(58) Field of Classification Search
    None
    See application file for complete search history.

(56) References Cited

U.S. PATENT DOCUMENTS

| | | | | |
|---|---|---|---|---|
| 5,484,238 A | * | 1/1996 | Bielagus | ............. B65B 69/0008 |
| | | | | 414/412 |
| 2022/0119146 A1 | * | 4/2022 | Liu | ...................... B02C 18/0084 |

FOREIGN PATENT DOCUMENTS

| CN | 105600048 A | * | 5/2016 |
|---|---|---|---|
| CN | 205396751 U | | 7/2016 |

(Continued)

OTHER PUBLICATIONS

English translation of CN-115384891-A, date: Nov. 25, 2022.*

(Continued)

*Primary Examiner* — Hwei-Siu C Payer
(74) *Attorney, Agent, or Firm* — LOZA & LOZA, LLP; Michael F. Fedrick

(57) ABSTRACT

A bag breaking device for garbage bags, which includes a horizontal moving mechanism, a vertical moving mechanism mounted on the horizontal moving mechanism, and a bag breaking mechanism mounted on the vertical moving mechanism; the bag breaking mechanism includes a first motor on the vertical moving mechanism, a first housing fixedly connected to an output end of the first motor, a second housing fixed on the first housing, a second motor fixed in the first housing, a first screw rod fixedly connected to an output end of the second motor, a screw block scraper rotatably mounted on the first screw rod, and a cylindrical knife fixed on the second housing.

9 Claims, 4 Drawing Sheets

(56) References Cited

FOREIGN PATENT DOCUMENTS

| | | | | |
|---|---|---|---|---|
| CN | 106312196 | A | 1/2017 | |
| CN | 206085099 | U | 4/2017 | |
| CN | 106697459 | A * | 5/2017 | ......... B65B 69/0008 |
| CN | 208248481 | U | 12/2018 | |
| CN | 110697181 | A | 1/2020 | |
| CN | 211281779 | U | 8/2020 | |
| CN | 212142873 | U * | 12/2020 | |
| CN | 115384891 | A * | 11/2022 | |
| KR | 20180052303 | A | 5/2018 | |

OTHER PUBLICATIONS

English translation of CN-105600048-A, date: May 25, 2016.*
English translation of CN-106697459-A, date: May 24, 2017.*
English translation of CN-212142873-U, date: Dec. 15, 2020.*
International Search Report of PCT Patent Application No. PCT/CN2020/120512 issued on Jan. 12, 2021.

* cited by examiner

BAG BREAKING DEVICE FOR GARBAGE BAG

CROSS REFERENCE TO RELATED APPLICATIONS

The present application is a Continuation Application of PCT Application No. PCT/CN2020/120512 filed on Oct. 13, 2020, which claims the benefit of Chinese Patent Application No. 201910991941.9 filed on Oct. 18, 2019. All the above are hereby incorporated by reference in their entirety.

TECHNICAL FIELD

The present invention relates to the technical field of bag breaking devices, in particular to a bag breaking device for garbage bags.

BACKGROUND

With the continuous improvement of the quality of life of our people, the amount of garbage produced in our country is also constantly increasing every year. If a large amount of garbage cannot be disposed of in time, a large amount of garbage will accumulate, which will often pollute the environment, overflow sewage, and emit foul smells. According to statistics, many of the garbage produced in my country can be recycled, but the recovery rate is not high, and people's awareness of garbage classification is not high enough. Therefore, the development of automatic garbage classification devices can be described as meeting the urgent needs of society. Nowadays, waste sorting is still done mainly by labor, which is not only time-consuming and labor-intensive, but also very inefficient. If a large-scale waste crusher is used, it will be difficult to recycle all the waste.

SUMMARY OF THE INVENTION

In view of the technical problems existing in the prior art, the purpose of the present invention is to provide a new type of garbage bag breaking device, which has faster bag breaking efficiency and effectively achieves the effect of rapid bag breaking.

In order to achieve the above objective, the present invention adopts the following technical solutions:

A bag breaking device for garbage bags includes a horizontal moving mechanism, a vertical moving mechanism mounted on the horizontal moving mechanism, and a bag breaking mechanism mounted on the vertical moving mechanism; the bag breaking mechanism includes a first motor mounted on the vertical moving mechanism, a first housing fixedly connected to an output end of the first motor, a second housing fixed on the first housing, a second motor fixed in the first housing, a first screw rod fixedly connected to an output end of the second motor, a screw block scraper rotatably mounted on the first screw rod, and a cylindrical knife fixed on the second housing; the screw block scraper includes an internal thread block and a blade; one end of the cylindrical knife is provided with a cutter head, and the other end of the cylindrical knife is fixed on the second housing; the cylindrical knife is provided with a central through hole and a side groove, wherein the central through hole penetrates the cylindrical knife along an axis of the cylindrical knife, and the side groove penetrates a circumferential side of the cylindrical knife along the diameter of the cylindrical knife; the first screw rod is located in the central through hole of the cylindrical knife, the internal thread of the internal thread block is matched with the external thread of the first screw rod, and the blade passes through the side groove and is fixedly connected with the internal thread block. The horizontal moving mechanism and the vertical moving mechanism cooperate to drive the bag breaking mechanism to move, and the first motor indirectly drives the cutter head to rotate to break the garbage bag. In the bag breaking process, the debris of the garbage bag may be entangled on the cutter head, during which the second motor indirectly drives the screw block scraper to move downward to scrape off the debris.

The first motor and the second motor are both vertically arranged, while the first housing and the second housing are both cylindrical. The second housing is fixed below the first housing, and the rotation axes of the first motor, the second motor, the first housing, and the second housing are on the same vertical line. The first motor drives the first housing to rotate, the first housing drives the second housing to rotate, and the second housing drives the cylindrical knife to rotate, so as to break the garbage bag by the rotation of the cylindrical knife. The second motor drives the first screw rod to rotate through a coupling, and when the first screw rod rotates, the internal thread block drives the blade to move up and down.

The top of the first housing is fixedly provided with a bearing frame; the bearing frame is provided with a first shaft hole, and an output shaft of the first motor passes through the first shaft hole and is fixedly connected with the bearing frame. The first motor drives the bearing frame to rotate, thereby driving the first housing to rotate.

The output end of the second motor is connected to a first coupling, the top of the second housing is provided with a second shaft hole, the output end of the second motor passes through the second shaft hole and fixedly connect to the first screw rod through the first coupling, the first coupling being located in the second housing. The second motor drives the first screw rod to rotate through the coupling to realize the up and down movement of the screw block scraper.

The first housing is fixed on the top of the second housing by bolts and nuts, and the bottom of the second housing is provided with a bottom plate, wherein the bottom plate is fixedly connected to the second housing by bolts and nuts; the head of the cylindrical knife is facing down, and the cylindrical knife is fixedly connected with the bottom plate through bolts and nuts. The bottom plate of the second housing is used to fix the cylindrical knife so that the cylindrical knife can rotate with the rotation of the second housing.

A portion of the cylindrical knife is located above the bottom plate and in the second housing, while the rest of the cylindrical knife is located under the bottom plate and the side groove is located on this portion. The first screw rod is completely located in the central through hole of the cylindrical knife, and the screw block scraper moves up and down under the bottom plate.

The screw block scraper is V-shaped, the internal thread block is cylindrical, and the blade edge of the blade faces downwards, so that when the blade moves downward, the debris wrapped around the cutter head are scraped off.

The horizontal moving mechanism includes a horizontal frame, a driving pulley and a driven pulley rotatably mounted on the horizontal frame, a timing belt sleeved on the driving pulley and the driven pulley, a sliding table fixed on the timing belt, a third motor, and a second coupling; the driving pulley and the driven pulley are on the same horizontal line, the horizontal frame is fixed with a motor frame, the third motor is vertically arranged and the body of the third motor is fixed on the motor frame; the driving pulley is fixedly provided with a wheel shaft, an output end of the third motor is fixedly connected with the wheel shaft through the second coupling, and the vertical moving mechanism is fixed on the sliding table. The horizontal moving mechanism can drive the vertical moving mechanism to move horizontally, thereby driving the bag breaking mechanism to move horizontally to adjust the position of the cutter head.

The vertical moving mechanism includes a vertical frame fixedly connected to the sliding table, a fourth motor fixed on the vertical frame, a third coupling, a second screw rod rotatably mounted on the vertical frame, a threaded slider sleeved on the second screw rod, a cross beam fixed on the threaded slider, and a connecting frame fixed on the cross beam; an output end of the fourth motor is fixedly connected with the second screw rod through the third coupling, and the connecting frame is fixedly connected to the body of the first motor. The vertical moving mechanism can drive the bag breaking mechanism to move up and down to adjust the position of the cutter head.

The fourth motor is arranged vertically and the body of the fourth motor is fixed on the top of the vertical frame; one end of the second screw rod is rotatably mounted at a lower end of the vertical frame, and the other end of the second screw rod is fixedly connected to an output end of the fourth motor through the third coupling.

In general, the present invention has the following advantages:

A garbage bag breaking device of the present invention uses a horizontal moving mechanism and a vertical moving mechanism to allow the bag breaking mechanism to move horizontally and longitudinally, respectively, which increases the flexibility of the bag breaking mechanism and improves the control accuracy. When the bag breaking mechanism moves to a designated position, the first motor of the bag breaking mechanism drives the cylindrical knife to rotate, and the bottom cutter head of the cylindrical knife rotates to wrap and tear the garbage bag to break the bag. After the bag is broken, the blade moves downward to cut the garbage bag wound on the cutter head, so that it is separated from the bag breaking mechanism, avoiding too many garbage bags entangled on the cutter head and affecting the bag breaking effect. The invention has simple and compact construction, with high flexibility, strong applicability, and faster bag breaking efficiency, which effectively achieves rapid bag breaking.

DETAILED DESCRIPTION

Figure 1:
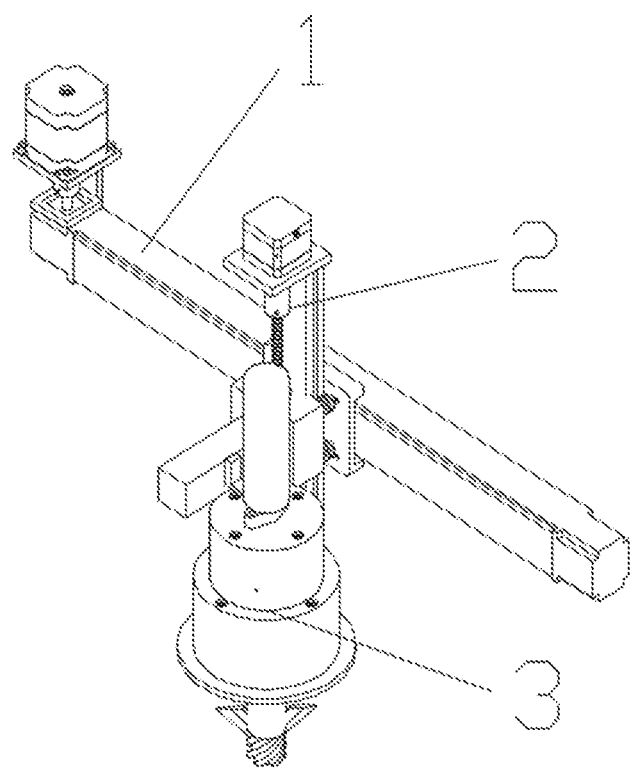
FIG. 1 is a schematic diagram of the structure of the bag breaking device.

Hereinafter, the present invention will be further described in detail with reference to the drawings and specific embodiments.

In order to facilitate the review of the reference signs in the drawings of the specification, the reference signs in the drawings of the specification are described as follows:

1 is a horizontal moving mechanism, 2 is a vertical moving mechanism, 3 is a bag breaking mechanism, 4 is a first motor, 5 is a first housing, 6 is a second housing, 7 is a first screw rod, 8 is a screw block scraper, 9 is a cylindrical knife, 10 is an internal thread block, 11 is a blade, 12 is a central through hole, 13 is a side groove, 14 is a cutter head, 15 is a first coupling, 16 is a bottom plate, 17 is a horizontal frame, 18 is a timing belt, 19 is a sliding table, 20 is a third motor, 21 is a second coupling, 22 is a motor frame, 23 is an axle, 24 is a vertical frame, 25 is a fourth motor, 26 is a third coupling, 27 is a second screw rod, 28 is a threaded slider, 29 is a beam, 30 is a connecting frame, 31 is a second motor, and 32 is a bearing frame.

Figure 2:
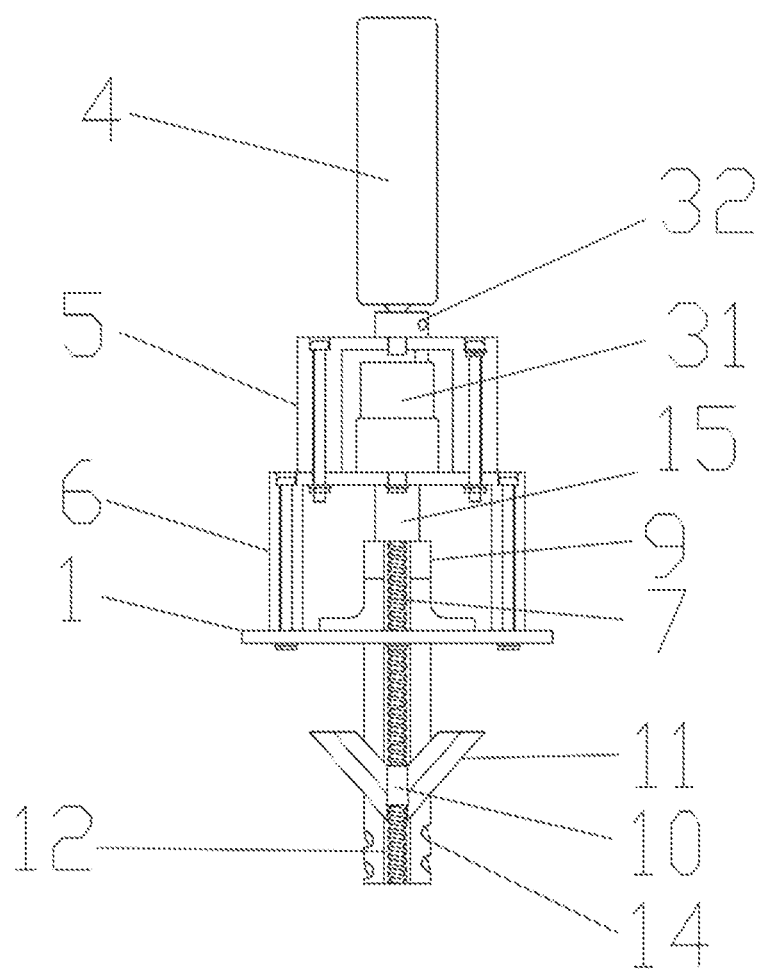
FIG. 2 is a cross-sectional view of the bag breaking mechanism.
Figure 3:
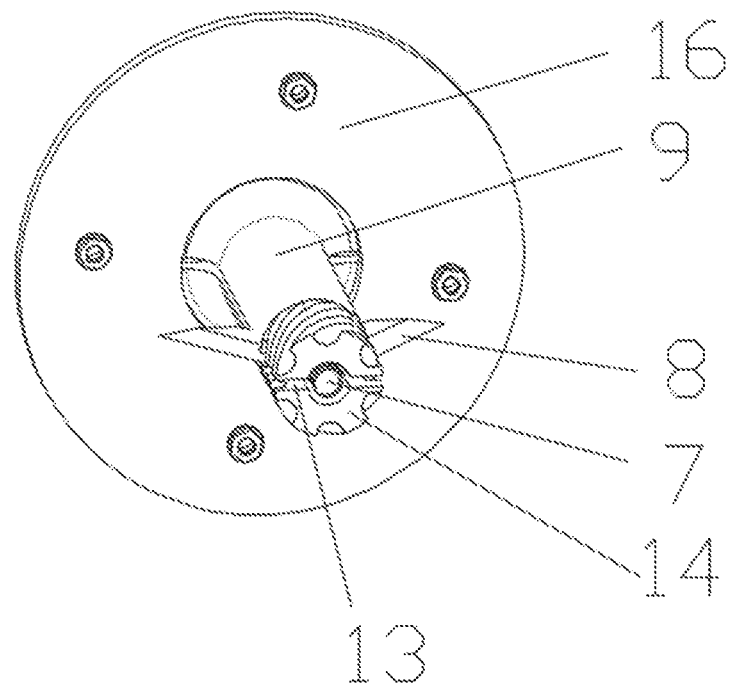
FIG. 3 is a schematic diagram of the structure of the bottom plate, the first screw rod, the cylindrical knife, and the screw block scraper.

As shown in FIG. 1, FIG. 2, and FIG. 3, a garbage bag breaking device includes a horizontal moving mechanism 1, a vertical moving mechanism 2 mounted on the horizontal moving mechanism 1, and a bag breaking mechanism 3 mounted on the vertical moving mechanism 2; the horizontal moving mechanism 1 drives the vertical moving mechanism 2 to move in horizontal direction, and the vertical moving mechanism 2 drives the bag breaking mechanism 3 to move in vertical direction. The bag breaking mechanism 3 includes a first motor 4 mounted on the vertical moving mechanism 2, a first housing 5 fixedly connected to an output end of the first motor 4, a second housing 6 fixed on the first housing 5, a second motor 31 fixed on the first housing 5, a first screw rod 7 fixedly connected to an output end of the second motor 31, a screw block scraper 8 rotatably mounted on the first screw rod 7, a cylindrical knife 9 fixed on the second housing 6; the first motor 4 and the second motor 31 are arranged vertically, the first housing 5 and the second housing 6 are cylindrical, the second housing 6 is fixed below the first housing 5; rotation axes of the first motor 4, the second motor 31, the first housing 5, the second housing 6, and the cylindrical knife 9 are located on the same vertical line. The first motor 4 rotates to drive the first housing 5 to rotate, the first housing 5 drives the second housing 6 to rotate, and the second housing 6 rotates to drive the cylindrical knife 9 to rotate. The cutter head 14 of the cylindrical knife 9 rotates for bag breaking. The screw block scraper 8 includes an internal thread block 10 and a blade 11; one end (lower end) of the cylindrical knife 9 is provided with a cutter head 14, the other end (upper end) of the cylindrical knife 9 is fixed on the second housing 6, and the cylindrical knife 9 is provided with a central through hole 12 and a side groove 13, wherein the central through hole 12 penetrates the cylindrical knife 9 along the axis of the cylindrical knife 9, and the side groove 13 penetrates a circumferential side of the cylindrical knife 9 along the diameter of the cylindrical knife 9, so that viewing from one end of the cutter head 14 along the axial direction of the cylindrical knife 9, the cylindrical knife 9 is divided into two semicircles by the side groove 13. The first screw rod 7 is located in the central through hole 12 of the cylindrical knife 9, and the cylindrical knife 9 is sleeved on the first screw rod 7. The internal thread of the internal thread block 10 is matched with the external thread of the first screw rod 7, the internal thread block 10 is located in the central through hole 12, the blade 11 has two pieces, the internal thread block 10 is cylindrical, and the two blades 11 are symmetrically distributed on the outer circumferential surface of the internal thread block 10; the blade 11 passes through the side groove 13 from the outside and is fixedly connected to the outer circumferential surface of the internal thread block 10. The cutter head 14 and the cylindrical cutter 9 are integrally formed.

A bearing frame 32 is fixedly provided on the top of the first housing 5, and the bearing frame 32 is fixed on the upper surface of the housing. The bearing frame 32 is provided with a first shaft hole, the first shaft hole is located in the circumferential center of the upper surface of the first housing 5, the output shaft of the first motor 4 passes through the first shaft hole and is fixedly connected with the bearing frame 32, in order to prevent interference of the output shaft with the upper surface of the first housing 5; the upper surface of the first housing 5 is also provided with a through hole, which communicates with the first shaft hole.

The output end of the second motor 31 is connected to the first coupling 15, and the top end (upper surface) of the second housing 6 is provided with a second shaft hole. The output end of the second motor 31 passes through the second shaft hole and then through the first coupling 15 to fixedly connect with the first screw rod 7, the upper surface of the second housing 6 and the inside of the first housing 5 form a closed area, the second motor 31 is located in the closed area, and the first coupling 15 is located in the closed area formed by the second housing 6 and the bottom plate 16. The second motor 31 drives the first screw rod 7 to rotate through the first coupling 15. When the first screw rod 7 rotates, the screw block scraper 8 moves up and down in the space formed by the central through hole 12 and the side groove 13, and the screw block scraper 8 can scrape off the garbage bag fragments wound on the cutter head 14.

The first housing 5 is fixed on the top of the second housing 6 by bolts and nuts, and the bolts pass through the first housing 5 and the second housing 6 sequentially from top to bottom. The bottom of the second housing 6 is provided with a bottom plate 16 which is fixedly connected to the second housing 6 by bolts and nuts, and the bolts pass through the second housing 6 and the bottom plate 16 sequentially from top to bottom. The cutter head 14 of the cylindrical knife 9 faces downwards, and the cylindrical knife 9 is fixedly connected to the upper surface of the bottom plate 16 by bolts and nuts.

A portion of the cylindrical knife 9 is located above the bottom plate 16 and in the second housing 6, while the rest of the cylindrical knife 9 is located below the bottom plate 16 and the side groove 13 is located on this portion; and the screw block scraper 8 can only move up and down below the bottom plate 16.

The screw block scraper 8 is V-shaped, the internal thread block 10 is cylindrical, and the internal thread block 10 and the blade 11 are integrally formed. The cutting edge of the blade 11 faces downward, and when the screw block scraper 8 moves downward, the cutting edge can cut the garbage bag fragments wound on the cutter head 14 of the cylindrical knife 9.

Figure 4:
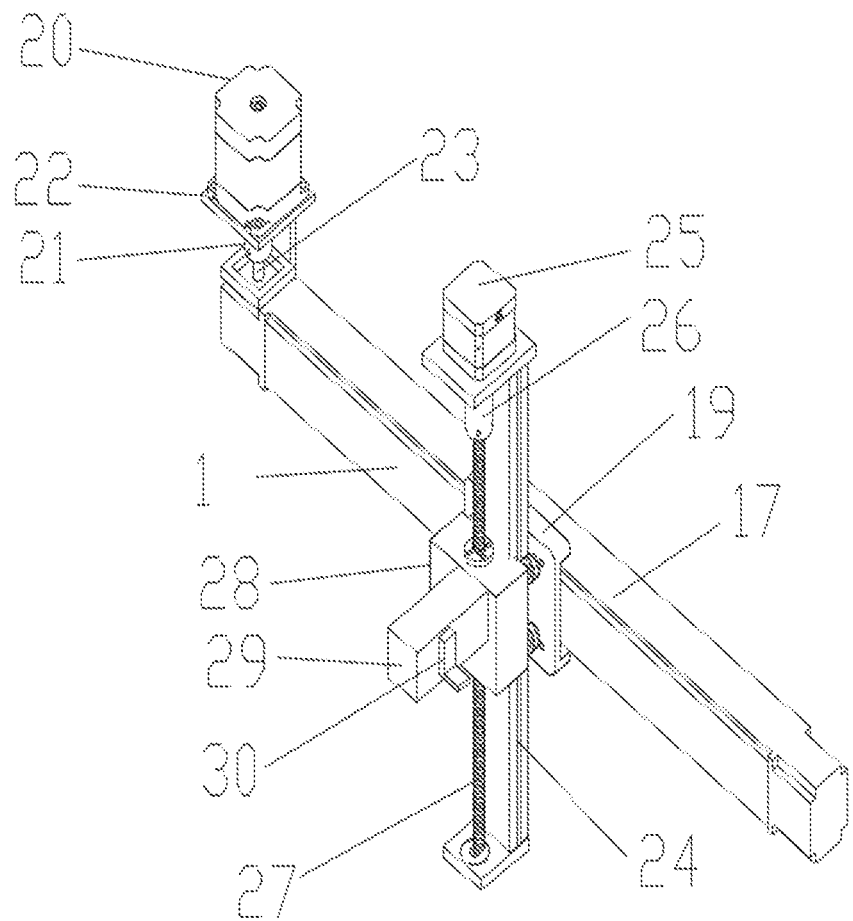
FIG. 4 is a schematic diagram of the structure of the horizontal moving mechanism and the vertical moving mechanism.

As shown in FIG. 1 and FIG. 4, the horizontal moving mechanism 1 includes a horizontal frame 17, a driving pulley and a driven pulley that are both rotatably mounted on the horizontal frame 17, a timing belt sleeved on the driving pulley and the driven pulley, a sliding table 19 fixed on the timing belt, a third motor 20, and a second coupling 21; the driving pulley and the driven pulley are located in the horizontal frame 17, the driving pulley and the driven pulley are not shown in the figure, the driving pulley and the driven pulley are located on the same horizontal line, and the timing belt moves in the horizontal direction to drive the sliding table 19 to move. The horizontal frame 17 is fixedly provided with a motor frame 22, and the motor frame 22 is located on the upper end surface of the horizontal frame 17. The third motor 20 is arranged vertically and the body of the third motor 20 is fixed on the motor frame 22. A wheel shaft 23 is fixed on the driving pulley, the wheel shaft 23 drives the driving pulley to rotate, the output end of the third motor 20 faces downward and is fixedly connected with the wheel shaft 23 through the second coupling 21, and the vertical moving mechanism 2 is fixed on the sliding table 19. The third motor 20 drives the timing belt to move, and the sliding table 19 on the timing belt moves back and forth in the horizontal direction to drive the vertical moving mechanism 2 to move back and forth in the horizontal direction.

The vertical moving mechanism 2 includes a vertical frame 24 fixedly connected to the sliding table 19, a fourth motor 25 fixed on the vertical frame 24, a third coupling 26, a second screw rod 27 rotatably mounted on the vertical frame 24, a threaded slider 28 sleeved on the second screw rod 27, a cross beam 29 fixed on the threaded slider 28, and a connecting frame 30 fixed on the cross beam 29; the output end of the fourth motor 25 is fixedly connected to the second screw rod 27 through the third coupling 26, and the connecting frame 30 is fixedly connected to the body of the first motor 4. The fourth motor 25 drives the second screw rod 27 to rotate. The internal thread of the threaded slider 28 is matched with the external thread of the second screw rod 27. When the second screw rod 27 rotates, the threaded slider 28 is driven to move up and down. The lateral surface of the body of the first motor 4 is fixedly connected to the connecting frame 30. When the threaded slider 28 slides up and down, the connecting frame 30 indirectly drives the entire bag breaking mechanism 3 to move up and down.

The fourth motor 25 is vertically arranged and the body of the fourth motor 25 is fixed on the top of the vertical frame 24, the output end of the fourth motor 25 faces downward, wherein one end (lower end) of the second screw rod 27 is rotatably mounted on the lower end of the vertical frame 24, and the other end (upper end) of the second screw rod 27 is fixedly connected to the output end of the fourth motor 25 through the third coupling 26.

The working principle of the bag breaking device: the horizontal moving mechanism 1 and the vertical moving mechanism 2 are coupled, and the bag breaking mechanism 3 also moves along with the coupling of the horizontal moving mechanism 1 and the vertical moving mechanism 2. After the bag breaking mechanism 3 reaches the designated area, the first motor 4 rotates to drive the cylindrical knife 9 to rotate, and the cutter head 14 of the cylindrical knife 9 breaks the garbage bag. When the cylindrical knife 9 breaks the bag, fragments of the garbage bag may be wrapped on the cutter head 14. At this time, the second motor 31 is started, and the second motor 31 drives the first screw rod 7 to rotate to drive the screw block scraper 8 to move down to the cutter head 14 and to scrape off the debris wrapped on the cutter head 14. After scraping, the screw block scraper 8 moves up and returns to the initial position, so as to complete the entire bag breaking process. Because the side groove 13 is provided on the cylindrical knife 9, no interference occurs during the upward and downward movement of the screw block scraper 8. After the bag breaking process is completed, the horizontal moving mechanism 1 and the vertical moving mechanism 2 couple with each other to move the bag breaking mechanism 3 to the initial position or the next designated area for bag breaking.

The above-mentioned embodiments are preferred embodiments of the present invention, but the embodiments of the present invention are not limited by the above-mentioned embodiments, and any other changes, modifications, substitutions, combinations, simplifications made without departing from the spirit and principle of the present invention all should be equivalent replacement methods, and they are all included in the protection scope of the present invention.

What is claimed is:

1. A bag breaking device for garbage bags, characterized in that, it comprises: a horizontal moving mechanism, a vertical moving mechanism mounted on the horizontal moving mechanism, and a bag breaking mechanism mounted on the vertical moving mechanism; the bag breaking mechanism includes a first motor mounted on the vertical moving mechanism, a first housing fixedly connected to an output end of the first motor, a second housing fixed on the first housing, a second motor fixed in the first housing, a first screw rod fixedly connected to an output end of the second motor, a screw block scraper rotatably mounted on the first screw rod, and a cylindrical knife fixed on the second housing; the screw block scraper includes an internal thread block and a blade; one end of the cylindrical knife is provided with a cutter head, and the other end of the cylindrical knife is fixed on the second housing; the cylindrical knife is provided with a central through hole and a side groove, wherein the central through hole penetrates the cylindrical knife along an axis of the cylindrical knife, and the side groove penetrates a circumferential side of the cylindrical knife along the diameter of the cylindrical knife; the first screw rod is located in the central through hole of the cylindrical knife, internal threads of the internal thread block are matched with external threads of the first screw rod, and the blade passes through the side groove and is fixedly connected with the internal thread block.

2. The bag breaking device for garbage bags according to claim 1, characterized in that, the first motor and the second motor are vertically arranged, while the first housing and the second housing are both cylindrical; the second housing is fixed below the first housing, and the rotation axes of the first motor, the second motor, the first housing, and the second housing are on the same vertical line.

3. The bag breaking device for garbage bags according to claim 2, characterized in that, the top of the first housing is fixedly provided with a bearing frame; the bearing frame is provided with a first shaft hole, and an output shaft of the first motor passes through the first shaft hole and is fixedly connected with the bearing frame.

4. The bag breaking device for garbage bags according to claim 3, characterized in that, the output end of the second motor is connected to a first coupling, the top of the second housing is provided with a second shaft hole, the output end of the second motor passes through the second shaft hole and fixedly connect to the first screw rod through the first coupling, the first coupling being located in the second housing.

5. The bag breaking device for garbage bags according to claim 4, characterized in that, the first housing is fixed on the top of the second housing by bolts and nuts, and the bottom of the second housing is provided with a bottom plate, wherein the bottom plate is fixedly connected to the second housing by bolts and nuts; a head of the cylindrical knife is facing down, and the cylindrical knife is fixedly connected with the bottom plate through bolts and nuts.

6. The bag breaking device for garbage bags according to claim 5, characterized in that, a portion of the cylindrical knife is located above the bottom plate and in the second housing, while the rest of the cylindrical knife is located under the bottom plate and the side groove is located on this portion.

7. The bag breaking device for garbage bags according to claim 3, characterized in that, the vertical moving mechanism includes a vertical frame fixedly connected to a sliding table, a third motor fixed on the vertical frame, a third coupling, a second screw rod rotatably mounted on the vertical frame, a threaded slider sleeved on the second screw rod, a cross beam fixed on the threaded slider, and a connecting frame fixed on the cross beam; an output end of the third motor is fixedly connected with the second screw rod through the third coupling, and the connecting frame is fixedly connected to the body of the first motor.

8. The bag breaking device for garbage bags according to claim 7, characterized in that, the third motor is arranged vertically and the body of the third motor is fixed on the top of the vertical frame; one end of the second screw rod is rotatably mounted at a lower end of the vertical frame, and the other end of the second screw rod is fixedly connected to an output end of the third motor through the third coupling.

9. The bag breaking device for garbage bags according to claim 1, characterized in that, the screw block scraper is V-shaped, the internal thread block is cylindrical, and a blade edge of the blade faces downwards.

\* \* \* \* \*